US010586068B2

(12) United States Patent
Nerurkar et al.

(10) Patent No.: US 10,586,068 B2
(45) Date of Patent: *Mar. 10, 2020

(54) DIFFERENTIALLY PRIVATE PROCESSING AND DATABASE STORAGE

(71) Applicant: LeapYear Technologies, Inc., Berkeley, CA (US)

(72) Inventors: Ishaan Nerurkar, Berkeley, CA (US); Christopher Hockenbrocht, Berkeley, CA (US); Liam Damewood, Walnut Creek, CA (US)

(73) Assignee: LeapYear Technologies, Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,437

(22) Filed: Jan. 2, 2019

(65) Prior Publication Data
US 2019/0138743 A1    May 9, 2019

Related U.S. Application Data

(63) Continuation-in-part of application No. 15/793,898, filed on Oct. 25, 2017, now Pat. No. 10,242,224, (Continued)

(51) Int. Cl.
*G06F 21/62* (2013.01)
*G06F 16/2455* (2019.01)
(Continued)

(52) U.S. Cl.
CPC ........ *G06F 21/6227* (2013.01); *G06F 16/248* (2019.01); *G06F 16/2453* (2019.01);
(Continued)

(58) Field of Classification Search
CPC ............. G06F 21/6227; G06F 21/6254; G06F 21/6245; G06F 16/2455; G06F 16/248;
(Continued)

(56) References Cited

U.S. PATENT DOCUMENTS 6,546,389 B1    4/2003    Agrawal et al.
7,219,237 B1    5/2007    Trimberger
(Continued)

FOREIGN PATENT DOCUMENTS

WO    WO 2015/090445 A1    6/2015
WO    WO 2015/157020 A1    10/2015
WO    WO 2017/187207 A1    11/2017

OTHER PUBLICATIONS

Du, W., Han, Y.S. and Chen, S., Apr. 2004, Privacy-preserving multivariate statistical analysis: Linear regression and classification. In Proceedings of the 2004 SIAM international conference on data mining (pp. 222-233). Society for Industrial and Applied Mathematics. (Year: 2004).*
(Continued)

*Primary Examiner* — Robert B Leung
(74) *Attorney, Agent, or Firm* — Fenwick & West LLP

(57) ABSTRACT

A hardware database privacy device is communicatively coupled to a private database system. The hardware database privacy device receives a request from a client device to perform a query of the private database system and identifies a level of differential privacy corresponding to the request. The identified level of differential privacy includes privacy parameters $(\epsilon, \delta)$ indicating the degree of information released about the private database system. The hardware database privacy device identifies a set of operations to be performed on the set of data that corresponds to the requested query. After the set of data is accessed, the set of operations is modified based on the identified level of differential privacy such that a performance of the modified set of operations produces a result set that is $(\epsilon, \delta)$-differentially private.

20 Claims, 11 Drawing Sheets

Related U.S. Application Data which is a continuation of application No. 15/203,797, filed on Jul. 7, 2016, now Pat. No. 10,192,069.

(60) Provisional application No. 62/249,938, filed on Nov. 2, 2015.

(51) Int. Cl.

| | | |
|---|---|---|
| *G06F 16/248* | (2019.01) | |
| *G06N 5/00* | (2006.01) | |
| *G06F 16/25* | (2019.01) | |
| *G06N 20/00* | (2019.01) | |
| *G06F 16/2453* | (2019.01) | |
| *G06N 20/10* | (2019.01) | |
| *G06N 20/20* | (2019.01) | |
| *H04L 29/06* | (2006.01) | |

(52) U.S. Cl.
CPC .... *G06F 16/2455* (2019.01); *G06F 16/24547* (2019.01); *G06F 16/25* (2019.01); *G06F 21/6218* (2013.01); *G06F 21/6245* (2013.01); *G06N 5/003* (2013.01); *G06N 20/00* (2019.01); *G06N 20/10* (2019.01); *G06N 20/20* (2019.01); *H04L 63/105* (2013.01)

(58) Field of Classification Search
CPC .. G06F 16/2462; G06F 16/2465; G06F 17/18; G06N 20/00; G06N 20/20
See application file for complete search history.

(56) References Cited

U.S. PATENT DOCUMENTS

| | | |
|---|---|---|
| 7,698,250 B2 | 4/2010 | Dwork et al. |
| 2005/0278786 A1 | 12/2005 | Tippett et al. |
| 2006/0161527 A1 | 7/2006 | Dwork et al. |
| 2006/0200431 A1 | 9/2006 | Dwork et al. |
| 2007/0136027 A1 | 6/2007 | Dwork et al. |
| 2007/0143289 A1 | 6/2007 | Dwork et al. |
| 2007/0239982 A1 | 10/2007 | Aggarwal et al. |
| 2009/0254971 A1 | 10/2009 | Herz et al. |
| 2009/0327228 A1 | 12/2009 | Krause et al. |
| 2011/0064221 A1 | 3/2011 | McSherry et al. |
| 2011/0078143 A1 | 3/2011 | Aggarwal |
| 2011/0131222 A1 | 6/2011 | DiCrescenzo |
| 2011/0208763 A1 | 8/2011 | McSherry et al. |
| 2011/0238611 A1 | 9/2011 | McSherry et al. |
| 2011/0282865 A1 | 11/2011 | Talwar et al. |
| 2012/0143922 A1 | 6/2012 | Rane et al. |
| 2012/0197864 A1 | 8/2012 | Bourdoncle et al. |
| 2014/0088989 A1 | 3/2014 | Krishnapuram et al. |
| 2014/0214735 A1* | 7/2014 | Harik .................. G06N 20/00 706/12 |
| 2014/0281572 A1 | 9/2014 | Wang et al. |
| 2014/0283091 A1 | 9/2014 | Zhang et al. |
| 2015/0235051 A1 | 8/2015 | Fawaz et al. |
| 2015/0286827 A1 | 10/2015 | Fawaz et al. |
| 2015/0293923 A1 | 10/2015 | Eide et al. |
| 2016/0283738 A1 | 9/2016 | Wang et al. |
| 2016/0335455 A1 | 11/2016 | Mohan et al. |
| 2017/0126694 A1 | 5/2017 | Nerurkar et al. |
| 2017/0169253 A1 | 6/2017 | Curcio et al. |
| 2017/0235974 A1 | 8/2017 | Zhang et al. |

OTHER PUBLICATIONS

Sanil, A.P., Karr, A.F., Lin, X. and Reiter, J.P., Aug. 2004, Privacy preserving regression modelling via distributed computation. In Proceedings of the tenth ACM SIGKDD international conference on Knowledge discovery and data mining (pp. 677-682). ACM. (Year: 2004).*

Cock, M.D., Dowsley, R., Nascimento, A.C. and Newman, S.C., Oct. 2015, Fast, privacy preserving linear regression over distributed datasets based on pre-distributed data. In Proceedings of the 8th ACM Workshop on Artificial Intelligence and Security (pp. 3-14). ACM. (Year: 2015).*

Amirbekyan, A. and Estivill-Castro, V., Sep. 2007, Privacy-preserving regression algorithms. In Proceedings of the 7th WSEAS International Conference on simulation, modelling and optimization (pp. 37-45). World Scientific and Engineering Academy and Society (WSEAS). (Year: 2007).*

Fang, W., Zhou, C. and Yang, B., 2013. Privacy preserving linear regression modeling of distributed databases. Optimization Letters, 7(4), pp. 807-818. (Year: 2013).*

Han, S., Ng, W.K., Wan, L. and Lee, V.C., 2009. Privacy-preserving gradient-descent methods. IEEE Transactions on Knowledge and Data Engineering, 22(6), pp. 884-899. (Year: 2009).*

Agrawal, R. et al., "Privacy-Preserving Data Mining," ACM SIGMOD, May 2000, pp. 439-450.

Bost, R. et al. "Machine Learning Classification over Encrypted Data". NDSS '15, Feb. 8-11, 2015, pp. 1-14.

Dwork, C. et al., "Differential Privacy and Robust Statistics," Proceedings of the Forty-First Annual ACM Symposium on Theory of Computing, Nov. 14, 2008, 42 pages, [Online] [Retrieved on Sep. 15, 2016], Retrieved from the Internet<URL:http://www.stat.cmu.edu/~jingle/dprs_stoc09.pdf>.

Dwork, C. "Differential Privacy: A Survey of Results," TAMC 2008, LNCS 4978, Agrawal, M. et al. (eds.), pp. 1-19.

Dwork, C., "A Firm Foundation for Private Data Analysis," Proceedings of the ACM, Jan. 2011, 8 pages, vol. 54, Issue 1.

Dwork, C. et al., "Calibrating Noise to Sensitivity in Private Data Analysis," Proceedings of the Third Conference on Theory of Cryptography, New York, NY, Mar. 4-7, 2006, pp. 265-284.

Friedman, A. et al., "Data Mining with Differential Privacy," Proceedings of the 16th ACM SIGKDD International Conference on Knowledge Discovery and Data Mining, Dec. 2010, 11 pages, [Online] [Retrieved on Sep. 13, 2016], Retrieved from the Internet<URL:http://users.cis.flu.edu/~lzhen001/activities/KDD_USB_key_2010/docs/p493.pdf>.

Huang, Y. et al., "Telco Churn Prediction with Big Data," Proceedings of the 2015 ACM SIGMOD International Conference on Management of Data, Jun. 4, 2015, 13 pages, [Online] [Retrieved on Sep. 13, 2016], Retrieved from the Internet<URL:http://users.wpi.edu/~yli15/Includes/SIGMOD15Telco.pdf>.

Jagannathan, G. et al., "A Practical Differentially Private Random Decision Tree Classifier," International Conference on Data Mining Workshops, Proceedings of the ICDM International Workshop on the Privacy Aspects of Data Mining, 2009, pp. 114-121.

Ji, Z. et al., "Differential Privacy and Machine Learning: a Survey and Review," Cornell University Library—arXiv preprint, Dec. 24, 2014, 32 pages, [Online] [Retrieved on Sep. 14, 2016], Retrieved from the Internet<URL:http://arxiv.org/pdf/1412.7584.pdf>.

Nissim, K. et al., "Smooth Sensitivity and Sampling in Private Data Analysis," Proceedings of the Thirty-Ninth Annual ACM Symposium on Theory of Computing, Jun. 13, 2007, 11 pages, [Online] [Retrieved on Sep. 14, 2016], Retrieved from the Internet<URL:http://www.cse.psu.edu/~sxr48/pubs/smooth-sensitiviy-stoc.pdf>.

Patil, A. et al., "Differential Private Random Forest," International Conference on Advances in Computing, Communications and Informatics, Sep. 27, 2014, 10 pages, [Online] [Retrieved on Sep. 14, 2016], Retrieved from the Internet<URL:http://ieeexplore.ieee.org/stamp/stamp.jsp?tp-&arnumber=6968348&isnumber=6968191>.

PCT International Search Report and Written Opinion, PCT Application No. PCT/US16/44178, dated Oct. 18, 2016, 20 pages.

Peng, S. et al., "Query Optimization for Differentially Private Data Management Systems", ICDE Conference 2013, pp. 1093-1104.

Xiao, X. et al., "iReduct: Differential Privacy with Reduced Relative Errors", SIGMOD' 11, Jun. 12-16, 2011, pp. 229-240.

Zhang, N. et al., "Distributed Data Mining with Differential Privacy", IEEE ICC 2011 proceedings.

Chaudhuri, K. et al., "Privacy-preserving logistic regression," Advances in Neural Information Processing Systems, 2009, pp. 289-296.

(56) References Cited

OTHER PUBLICATIONS

Zhang, J. et al., "Functional Mechanism: Regression Analysis under Differential Privacy," Proceedings of the VLDB Endowment, 2012, vol. 5, No. 11, pp. 1364-1375.
Shang, S. et al., "The Application of Differential Privacy for Rank Aggregation: Privacy and Accuracy," 17th International Conference on Information Fusion, Jul. 7, 2014, pp. 1-7.
Xiao, X. et al., "Differential privacy via wavelet transforms," IEEE Transactions on Knowledge and Data Engineering, Aug. 2011, vol. 23, No. 8, pp. 1200-1214.
Xu, J. et al., "Differentially Private Histogram Publication," IEEE 28th International Conference on Data Engineering, Apr. 2012, pp. 32-43.
Dankar, F. et al., "Practicing Differential Privacy in Health Care: A Review," Transactions on Data Privacy, 2013, vol. 5, pp. 35-67.
Extended European Search Report and Written Opinion, European Application No. 16862625.7, dated Mar. 27, 2019, 9 pages.
Frades, M.R., "Overview on Techniques in Cluster Analysis," in Bioinformatics in Clinical Research, Methods in Molecular Biology (Methods and Protocols), 2010, vol. 593, pp. 81-107.
Fraley, C. et al., "How Many Clusters? Which Clustering Method? Answers via Model-Based Cluster Analysis," The Computer Journal, 1998, vol. 41, No. 8, pp. 578-588.
Kellaris, G. et al., "Practical differential privacy via grouping and smoothing," Proceedings of the VLDB Endowment, Mar. 1, 2013, vol. 6, No. 5, pp. 301-312.
PCT International Search Report and Written Opinion, PCT Application No. PCT/US19/15035, dated Jun. 20, 2019, 14 pages.

\* cited by examiner

| Entry # | Feature 1 (cm) | Feature 2 (residence) |
|---|---|---|
| 1 | 163 | Italy |
| 2 | 136 | England |
| 3 | 180 | France |
| 4 | 347 | USA |
| 5 | 388 | China |
| 6 | 145 | France |
| 7 | 169 | Korea |
| 8 | 158 | USA |

| Feature 10 (age) | Feature 11 (Disease) |
|---|---|
| 37 | 0 |
| 87 | 0 |
| 54 | 1 |
| 34 | 0 |
| 18 | 0 |
| 13 | 1 |
| 65 | 1 |
| 17 | 1 |

DIFFERENTIALLY PRIVATE PROCESSING AND DATABASE STORAGE

CROSS-REFERENCE TO RELATED APPLICATIONS

This application is a continuation-in-part of U.S. patent application Ser. No. 15/793,898, filed Oct. 25, 2017, which is a continuation of U.S. patent application Ser. No. 15/203,797, filed Jul. 7, 2016, which claims the benefit of U.S. Patent Application No. 62/249,938, filed Nov. 2, 2015, all of which are incorporated by reference herein.

BACKGROUND

Field of Disclosure

The present invention generally relates to a database system, and more specifically to responding to a database query by executing a differentially private version of the query on the database.

Description of the Related Art

Personally identifiable information, such as health data, financial records, telecom data, and confidential business intelligence, such as proprietary data or data restricted by contractual obligations, is valuable for analysis and collaboration. Yet, only a fraction of such sensitive information is used by organizations or analysts for statistical or predictive analysis. Privacy regulations, security concerns, and technological challenges suppress the full value of data, especially personally identifiable information and confidential and proprietary records.

Methods that attempt to solve this problem, such as access controls, data masking, hashing, anonymization, aggregation, and tokenization, are invasive and resource intensive, compromise analytical utility, or do not ensure privacy of the records. For example, data masking may remove or distort data, compromising the statistical properties of the data. As another example, many of the above mentioned methods are not effective when information is stored in disparate data sources. Technology which enables organizations or analysts to execute advanced statistical and predictive analysis on sensitive information across disparate data sources without revealing record-level information is needed.

SUMMARY

A hardware database privacy device is communicatively coupled to a private database system. The hardware database privacy device receives a request from a client device to perform a query of the private database system and identifies a level of differential privacy corresponding to the request. The identified level of differential privacy includes a privacy parameter E indicating the degree of information released about data in the private database system.

The differentially private hardware database privacy device identifies a set of data stored in the private database system and a set of operations to be performed on the set of data that corresponds to the requested query. After the set of data is accessed, the set of operations is modified based on the identified level of differential privacy such that a performance of the modified set of operations produces a result set that is differentially private. The modified set of operations is performed on the accessed set of data to produce the differentially private result set. The differentially private result set is provided to the client device for display on a hardware display of the client device.

BRIEF DESCRIPTION OF DRAWINGS

FIG. 2 illustrates an example database structure, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
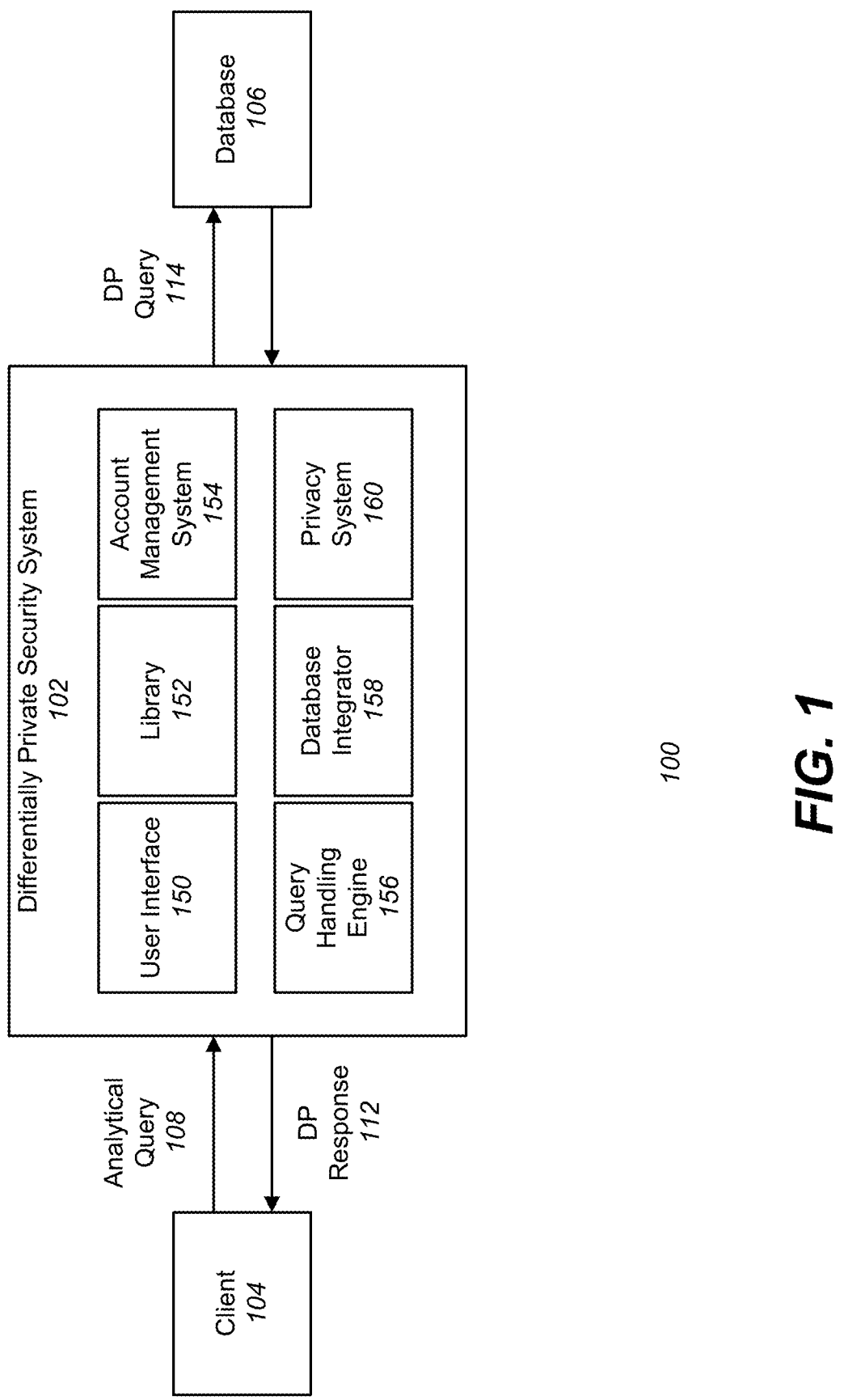
FIG. 1 illustrates a system for receiving a query for a private database, and for responding to the query by executing a differentially private version of the query on the private database.

FIG. 1 is a system 100 for receiving a query 108 for a private database 106, and responding to the query 108 by executing a differentially private (DP) version of the query 114 on the private database 106. The system 100 includes a differentially private security system 102 that receives the analytical query 108 from a client 104 and applies a DP version of the query 114 on the database 106. Subsequently, the differentially private security system 102 returns the response of the DP query 114 to the client 104 as the DP response 112.

The database 106 is one or more private databases managed by one or more entities that can only be accessed by authorized or trusted users. For example, the database 106 may contain health data of patients, financial records, telecom data, and confidential business intelligence, such as proprietary data or data restricted by contractual obligations. The information stored in the database 106 is of interest to one or more clients 104, but clients 104 may not have the necessary authorization to access to information contained in the databases 106.

FIG. 2 illustrates an example database structure, according to one embodiment. For the remainder of the application, a database, including one or more of the private databases 106, may be referred to as a matrix with a number of rows and columns. Each row is an entry of the database and each column is a feature of the database. Thus, each row contains a data entry characterized by a series of feature values for the data entry. For example, as shown in FIG. 2, the example database 200 contains 8 entries and 11 features, and illustrates a list of patient profiles. Each patient is characterized by a series of feature values that contain information on the patient's height (Feature 1), country of residence (Feature 2), age (Feature 10), and whether the patient has contracted a disease (Feature 11).

The feature values may be numerical in nature, e.g., Features 1 and 10, or categorical in nature, e.g., Features 2 and 11. In the case of categorical feature values, each category may be denoted as an integer. For example, in Feature 11 of FIG. 2, "0" indicates that the patient has not contracted a disease, and "1" indicates that the patient has contracted a disease.

Returning to FIG. 1, the client 104 may be a human analyst or an organization that does not have direct access to the database 106, but is interested in applying an analytical query 108 to the database 106. For example, the client 104 may be a data analyst, data scientist, or a health analyst that is interested in the profiles of the patients but does not have direct access to the database 106. Each client 104 of the system 100 is associated with a privacy budget and specifies a set of privacy parameters each time the client 104 submits a query 108. The privacy budget is a numerical value representative of a number and/or type of remaining queries 108 available to the client 104 in terms of the privacy parameters specified for each query 108.

The query 108 submitted by the client 104 may be simple queries, such as count queries that request the number of entries in the databases 106 that satisfy a condition specified by the client 104, or complicated queries, such as predictive analytics queries that request a data analytics model trained on the databases 106. Upon submitting a query 108 to the differentially private security system 102, the client 104 receives a DP response 112 to a differentially private version of the submitted query 114.

The client 104 specifies a set of privacy parameters each time the client 104 submits query 108. The privacy parameters indicate an amount of decrease in the privacy budget of the client 104 in return for a response to the query 108. As described below in more detail with reference to the privacy system 160 in FIG. 3, the privacy parameters specified by the client 104 also indicate the amount of information released about the database 106 to the client 104.

The differentially private security system 102 receives an analytical query 108 from the client 104 and applies a differentially private version of the query 114 on the database 106, such that it releases a degree of information about the database 106 indicated by the privacy parameters specified by the client 104, but also protects a degree of privacy of the databases 106 specified by the entities managing the database 106. For example, the entities managing the database 106 may also set a maximum threshold on the degree of information released about the database 106 for a given query 108 that the client 104 may not exceed. Thus, the differentially private security system balances privacy protection of the database 106 while releasing useful information on the database 106 to the client 104. The differentially private security system 102 may have complete or partial access to the databases 106.

Upon receiving a query 108, the differentially private security system 102 applies DP query 114 to the database 106 and returns a DP response 112 to the client 104. The DP query 114 is a differentially private version of the query 108 that satisfies a definition of differential privacy described in more detail with reference to the privacy system 160 in FIG. 3. The DP query 114 may include perturbing the response or output of the query 108 with noise, or perturbing the process for generating the output of the query 108 with noise. The resulting output of the DP query 114 is returned to the client 104 as DP response 112. Ideally, the DP response 112 correlates to the original output of the query 108 on the databases 106 but maintains the degree of privacy specified by the entities managing the database 106.

Differentially Private Security System

The differentially private security system 102 includes a user interface 150, a library 152, an account management system 154, a query handling engine 156, a data integration module 158, and a privacy system 160. Some embodiments of the differentially private security system 102 have different or additional modules than the ones described here. Similarly, the functions can be distributed among the modules in a different manner than is described here. Certain modules and functions can be incorporated into other modules of the differentially private security system 102.

The user interface 150 can generate a graphical user interface on a dedicated hardware device of the differentially private security system 102 or the client 104 in which the client 104 can submit an analytical query 108 and the desired privacy parameters, and view DP response 112 in the form of numerical values or images. The client 104 may also inspect database 106 schemata, view an associated privacy budget, or cache the DP response 112 to view the response later. The user interface 150 submits properly formatted query commands to other modules of the differentially private security system 102.

The library 152 contains software components that can be included in external programs that allow the client 104 to submit the analytical query 108, receive the DP response 112, and other functions within a script or program. For example, the client 104 may use the software components of the library 152 to construct custom data analytic programs. Each of the software components in the library 152 submits properly formatted query commands to other modules of the differentially private security system 102.

The account management system 154 receives properly formatted query commands (herein "query commands" or "QC"), parses the received query commands, and updates the account of the client 104 according to the received query command. For example, the account management system 154 may check the query commands for syntactic correctness, or check whether a client 104 has access to a requested resource. As another example, the account management system 154 may check whether the privacy parameters specified by the client 104 for a given analytical query 108 can be accommodated, and if so, decrement the privacy budget of the client 104 by the amount specified in the query 108. Query commands verified by the account management system 154 are provided to the query handling engine 156.

Examples of query commands accommodated by the differentially private security system 102 are listed below.

---

QC1. Count
'SELECT COUNT (<column>) FROM <database.table> WHERE <where_clause> BUDGET <eps> <delta>.
QC2. Median
'SELECT MEDIAN (<column>) FROM <database.table> WHERE <where_clause> BUDGET <eps> <delta>.
QC3. Mean
'SELECT MEAN (<column>) FROM <database.table> WHERE <where_clause> BUDGET <eps> <delta>.
QC4. Variance
'SELECT VARIANCE (<column>) FROM <database.table> WHERE <where_clause> BUDGET <eps> <delta>.
QC5. Inter-Quartile Range
'SELECT IQR (<column>) FROM <database.table> WHERE <where_clause> BUDGET <eps> <delta>.
QC6. Batch Gradient Descent
'SELECT <GLM> (<columns_x>,<column_y>,<params>) FROM <database.table> WHERE <where_clause> BUDGET <eps> <delta>.
QC7. Stochastic Gradient Descent
'SELECT SGD <GLM> (<column>) FROM <database.table> WHERE <where_clause> BUDGET <eps> <delta>.
QC8. Random Forest
'SELECT RANDOMFOREST (<columns_x>,<columns_y>) FROM <database.table> WHERE <where_clause> BUDGET <eps> <delta>.
QC9. Histogram
'SELECT HISTOGRAM (<column>) FROM <database.table> WHERE <where_clause_i> BUDGET <eps> <delta>.

---

The query handling engine 156 transforms the received query commands into appropriate function calls and database access commands by parsing the query command string. The function calls are specific to the query 108 requested by the client 104, and the access commands allow access to the required database 106. Different databases 106 require different access commands. The access commands are provided to the database integrator 158.

The database integrator 158 receives the access commands to one or more databases 106 and collects the required databases 106 and merges them into a single data object. The data object has a structure similar to that of a database structure described in reference to FIG. 2. The data object is provided to the privacy system 160.

The privacy system 160 receives the data object from the database integrator 158, appropriate function calls from the query handling engine 156 indicating the type of query 108 submitted by the client 104, privacy parameters specified for the query 108, and produces a DP response 112 to a differentially private version of the query 108 with respect to the databases 106. The privacy system 160 will be described in further detail in reference to FIG. 3 below.

Privacy System

Figure 3:
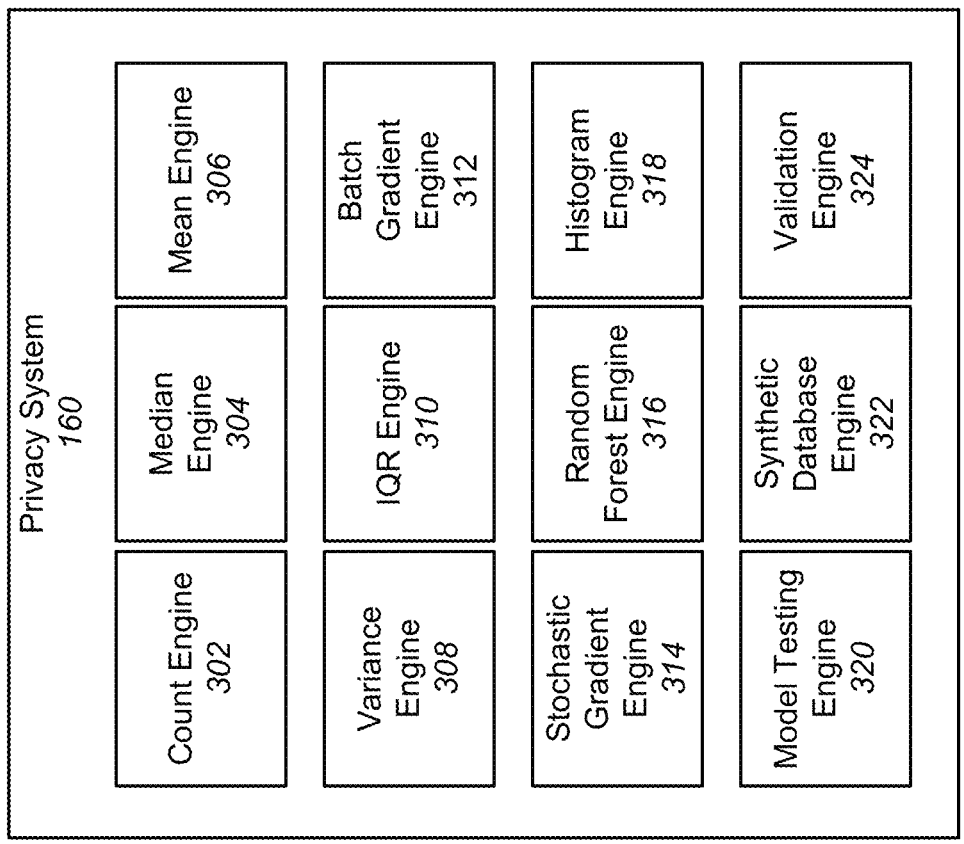
FIG. 3 is a block diagram illustrating the privacy system of the system in FIG. 1, according to one embodiment.

FIG. 3 is a block diagram illustrating the privacy system 160 of the system 100 shown in FIG. 1, according to one embodiment. The privacy system 160 includes a count engine 302, a mean engine 304, a median engine 306, a variance engine 308, an IQR engine 310, a batch gradient engine 312, a stochastic gradient engine 314, a random forest engine 316, a histogram engine 318, a model testing engine 320, and a synthetic database engine 322. Some embodiments of the privacy system 160 have different or additional modules than the ones described here. Similarly, the functions can be distributed among the modules in a different manner than is described here. Certain modules and functions can be incorporated into other modules of the privacy system 160.

Definition of Differential Privacy

For a given query 108, the privacy system 160 receives a data object X, function calls indicating the type of query 108, privacy parameters specified by the client 104, and outputs a DP response 112 to a differentially private version of the query 108 with respect to X. Each data object X is a collection of row vectors $x_{i=1, 2, \ldots, n}$, in which each row vector $x_i$ has a series of p elements $x_i^{j=1, 2, \ldots, p}$.

A query M satisfies the definition of ε-differential privacy if for all:

$$\forall X, X' \in \mathbb{D}, \forall S \subseteq \text{Range}(M): \frac{Pr[M(X) \in S]}{Pr[M(X') \in S]} \leq e^{\varepsilon}$$

where $\mathbb{D}$ is the space of all possible data objects, X, X' neighboring data objects, S is an output space of query M, and neighboring databases are defined as two data objects X, X' that have at most one different entry from one another. That is, given two neighboring data objects X, X' in which one has an individual's data entry, and the other does not, there is no output of query M that an adversary can use to distinguish between X, X'. That is, an output of such a query M that is differentially private reveals no information about the data object X. The privacy parameter ε controls the amount of information that the query M reveals about any individual data entry in X, and represents the degree of information released about the entries in X. For example, in the definition given above, a small value of ε indicates that the probability an output of query M will disclose information on a specific data entry is small, while a large value of ε indicates the opposite.

As another definition of differential privacy, a query M is (ε,δ)-differentially private if for neighboring data objects X, X':

$$\forall X, X' \in \mathbb{D}, \forall S \subseteq \text{Range}(M): \frac{Pr[M(X) \in S]}{Pr[M(X') \in S]} \leq e^{\varepsilon} + \delta.$$

The privacy parameter δ measures the improbability of the output of query M satisfying ε-differential privacy. As discussed in reference to FIG. 1, the client 104 may specify the desired values for the privacy parameters (ε,δ) for a query 108.

There are three important definitions for discussing the privacy system 160: global sensitivity, local sensitivity, and smooth sensitivity. Global sensitivity of a query M is defined as $$GS_M(X) = \max_{X, X': d(X, X')=1} \|M(X) - M(X')\|$$

where X, X' are any neighboring data objects, such that d(X, X')=1. This states that the global sensitivity is the most the output of query M could change by computing M on X and X'.

The local sensitivity of a query M on the data object X is given by:

$$LS_M(X) = \max_{X': d(X, X')=1} \|M(X) - M(X')\|$$

where the set {X': d(X, X')=1} denotes all data objects that have at most one entry that is different from X. That is, the local sensitivity $LS_M(X)$ is the sensitivity of the output of the query M on data objects X' that have at most one different entry from X, measured by a norm function.

Related to the local sensitivity $LS_M(X)$, the smooth sensitivity given a parameter $\beta$ is given by:

$$S_M(X;\beta) = \max_{X'\in\mathbb{D}} \|LS_M(X) \cdot e^{-\beta \cdot d(X,X')}\|$$

where $d(X, X')$ denotes the number of entries that differ between X and X'.

Notation for Random Variables

The notation in this section is used for the remainder of the application to denote the following random variables.

1) $G(\sigma^2)$, denotes a zero-centered Gaussian random variable with the probability density function $$f(x|\sigma^2) = \frac{1}{\sigma\sqrt{2\pi}} e^{-\frac{x^2}{2\sigma^2}}.$$

2) $L(b)$ denotes a zero-centered Laplacian random variable with the probability density function $$f(x|b) = \frac{1}{2b} e^{-\frac{|x|}{b}}.$$

3) $C(\gamma)$ denotes a zero-centered Cauchy random variable with the probability density function $$f(x|\gamma) = \frac{1}{\pi\gamma\left(1+\left(\frac{x}{\gamma}\right)^2\right)}.$$

Further, a vector populated with random variables R as its elements is denoted by v(R). A matrix populated with random variables R as its elements is denoted by M(R).

Count Engine 302

The count engine 302 produces a DP response 112 responsive to the differentially private security system 102 receiving a query 108 for counting the number of entries in a column of the data object X that satisfy a condition specified by the client 104, given privacy parameters ($\epsilon, \delta$). An example query command for accessing the count engine 302 is given in QC1 above. For the example data object X shown in FIG. 2, the client 104 may submit a query 108 to return a DP response 112 for the number of patients that are above the age of 30.

The count engine 302 retrieves the count q from X. If privacy parameter $\delta$ is equal to zero, the count engine 302 returns $$y \approx q + L\left(c_1 \cdot \frac{1}{\epsilon}\right),$$

as the DP response 112 for display on the user interface 150, where $c_1$ is a constant. An example value for $c_1$ may be 1. If the privacy parameter $\delta$ is non-zero, the count engine 302 returns $$y \approx q + G\left(c_1 \cdot 2 \cdot \log\frac{2}{\delta} \cdot \frac{1}{\epsilon^2}\right),$$

as the DP response 112 for display on the user interface 150, where $c_1$ is a constant. An example value for $c_1$ may be 1.

Figure 4:
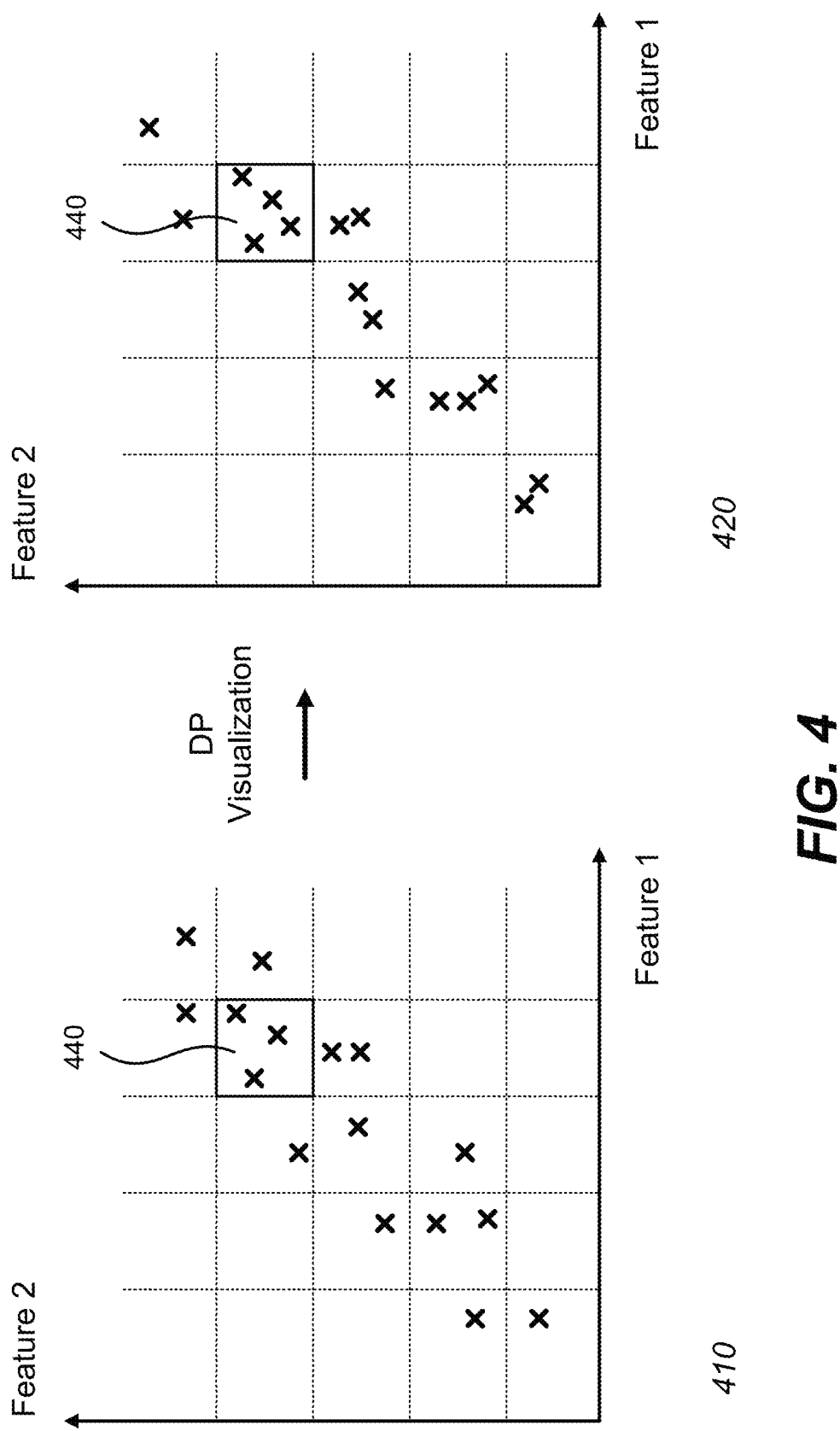
FIG. 4 illustrates displaying results of a differentially private count query, according to one embodiment.

The client 104 may request visualization of entries in the data object X for analysis of trends or patterns that depend on the features of the entries. In one embodiment, the privacy system 160 generates a differentially private visualization of the requested data entries from X. FIG. 4 illustrates displaying results of a differentially private count query to the user interface of the client, according to one embodiment.

The privacy system 160 first maps the requested entries from X for the selected features specified by the client 104. For example, as shown in the visualization 410 of FIG. 4, a series of requested entries are plotted depending on their values for Feature 1 and Feature 2. The privacy system 160 then generates disjoint regions on the plot and retrieves the counts of entries in each of the disjoint regions. In visualization 410, the privacy system 160 divides the plot into disjoint squares and retrieves the count of entries in each square.

For each disjoint region, the privacy system 160 submits a differentially private count query to the count engine 302, and randomly plots a number of entries determined by the DP response 112 of the count engine 302 for that region. The resulting DP visualization plot is returned to the client 104 for display to a user by the user interface 150. For example, square 440 in visualization 410 contains 3 entries, while the same square in DP visualization 420 contains 4 randomly plotted entries determined by the DP response 112 of the count engine 302.

Median Engine 304

The median engine 304 produces a DP response 112 responsive to the differentially private security system 102 receiving a query 108 for generating the median of entries in a column of the data object X that satisfy a condition specified by the client 104, given privacy parameters ($\epsilon, \delta$). An example query command for accessing the median engine 304 is given in QC2 above. For the example data object X shown in FIG. 2, the client 104 may submit a query 108 to return a DP response 112 for the median age of all patients in X.

The median engine 304 aggregates the values of entries satisfying the condition specified by the client 104 into a list U, and retrieves the median q from U. If privacy parameter $\delta$ is equal to zero, the median engine 304 returns $$y \approx q + c_1 + S_M(U; c_2 \cdot \epsilon) \cdot \frac{C(1)}{\epsilon}$$

as the DP response 112 for display on the user interface 150, in which $c_1$, $c_2$ are constant factors. Example values for $c_1$, $c_2$ may be 6 and ⅙, respectively. If $\delta$ is non-zero, the median engine 304 returns $$y \approx q + c_1 + S_M\left(U; c_2 \cdot \frac{\epsilon}{2 \cdot \log\frac{1}{\delta}}\right) \cdot \frac{L(1)}{\epsilon}$$

as the DP response 112 for display on the user interface 150. Example values for $c_1$, $c_2$ may be 2 and 1, respectively.

Mean Engine 306

The mean engine 306 produces a DP response 112 responsive the differentially private security system 102 receiving a query 108 for generating the mean of entries in a column of the data object X that satisfy a condition specified by the client 104, given privacy parameters ($\epsilon,\delta$). An example query command for accessing the mean engine 306 is given in QC3 above. For the example data object X shown in FIG. 2, the client 104 may submit a query 108 to return a DP response 112 for generating the mean age of patients that are above the age of 30.

The mean engine 306 aggregates the values of entries satisfying the condition specified by the client 104 into a list U. Assuming there are n values in U, the mean engine 306 further divides U into m sub-lists $V_{j=1, 2, \ldots, m}$ each with n/m values. The mean engine 306 aggregates each mean $r_j$ of sub-list $V_j$ into a list R. The mean engine 306 requests a differentially private median query of the values in R to the median engine 304. The resulting output from the median engine 304 is returned as the DP response 112 for display on the user interface 150.

Variance Engine 308

The variance engine 308 produces a DP response 112 responsive to the differentially private security system 102 receiving a query 108 for generating the variance of entries in a column of the data object X that satisfy a condition specified by the client 104, given privacy parameters ($\epsilon,\delta$). An example query command for accessing the variance engine 308 is given in QC4 above. For the example data object X shown in FIG. 2, the client 104 may submit a query 108 to return a DP response 112 for generating the variance of the age of all patients in X.

The variance engine 308 aggregates the values of entries satisfying the condition specified by the client 104 into a list U. Assuming there are n values in U, the variance engine 308 further divides U into m sub-lists $V_{j=1, 2, \ldots, m}$ each with n/m values. The variance engine 308 aggregates each variance $r_j$ of sub-list $V_j$ into a list R. The variance engine 308 requests a differentially private median query of the values in R to the median engine 304. The resulting output from the median engine 304 is returned as the DP response 112 for display on the user interface 150.

IQR Engine 310

The IQR engine 310 produces a DP response 112 responsive to the differentially private security system 102 receiving a query 108 for generating the interquartile range (IQR) of entries in a column of the data object X that satisfy a condition specified by the client 104, given privacy parameters ($\epsilon,\delta$). An example query command for accessing the IQR engine 310 is given in QC5 above. For the example data object X shown in FIG. 2, the client 104 may submit a query 108 to return a DP response 112 for generating the IQR of the age of all patients in X.

In one embodiment, the IQR engine 310 aggregates the values of entries satisfying the condition specified by the client 104 into a list U. Assuming there are n values in U, the sample IQR of U is denoted as IQR(U), and a log transform of IQR(U) is denoted as:

$$H_n(U) = \log_{1+\frac{1}{\log n}} IQR(U).$$

The IQR engine 310 further maps the quantity $H_n(U)$ to an integer $k_0$ such that $H_n(U) \in [k_0, k_0+1)$. The IQR engine 310 extracts a value $A_0(U)$ indicating the number of entries in U required to change in order for the new list $\tilde{U}$ to satisfy $H_n(\tilde{U}) \notin [k_0, k_0+1)$.

The IQR engine 310 then generates a value $R_0(U)$ given by:

$$R_0(U) \approx A_0(U) + L\left(\frac{c_1}{\epsilon}\right)$$

in which $c_1$ is a constant factor. If $R_0(U)$ is greater than a predetermined threshold, the IQR engine 310 returns $$y = IQR(U) \cdot \left(\frac{1}{1+\log n}\right)^{L\left(\frac{c_1}{\epsilon}\right)},$$

as the DP response 112 for display on the user interface 150. If $R_0(U)$ is equal to or less than the predetermined threshold, the IQR engine 310 returns "No Answer" as the DP response 112 for display on the user interface 150.

In another embodiment, the IQR engine 310 aggregates the values of entries satisfying the condition specified by the client 104 into an ordered list $\underline{U}$. The IQR engine 310 retrieves the first quartile and the third quartile from U, given by q and q', respectively. If $\delta$ is zero, the IQR engine 310 returns:

$$y \approx \left(q + c_1 \cdot S_M(U; c_2 \cdot \epsilon) \cdot \frac{C(1)}{\frac{\epsilon}{2}}\right) - \left(q' + c_1 \cdot S_M(U; c_2 \cdot \epsilon) \cdot \frac{C(1)}{\epsilon/2}\right)$$

as the DP response 112 for display on the user interface 150, in which $c_1$, $c_2$ are constant factors.

If $\delta$ is non-zero, the IQR engine 310 returns:

$$y \approx \left(q + c_1 \cdot S_M\left(U; c_2 \cdot \frac{\epsilon}{2 \cdot \log\frac{1}{\delta}}\right) \cdot \frac{L(1)}{\epsilon/2}\right) - \left(q' + c_1 \cdot S_M\left(U; c_2 \cdot \frac{\epsilon}{2 \cdot \log\frac{1}{\delta}}\right) \cdot \frac{L(1)}{\epsilon/2}\right)$$

as the DP response 112 for display on the user interface 150, in which $c_1$, $c_2$ are constant factors.

Batch Gradient Engine 312

The batch gradient engine 312 produces a DP response 112 responsive to the differentially private security system 102 receiving a valid query 108 for generating a set of parameters $\theta$ for a general linear model that captures the correlation between a series of observable features and a dependent feature, given privacy parameters ($\epsilon,\delta$). The general linear model is trained on the selected columns of X. An example query command for accessing the batch gradient engine 312 is given in QC6 above.

Given a row vector x that contains a series of observable features and a label feature y, the correlation between the observable features and the label feature in a general linear model may be given as:

$$y = x\theta^T,$$

where θ is a row vector containing parameters of the model. That is, the label feature is modeled as a weighted sum of the observable features, where each value in θ is the weight given to a corresponding observable feature.

For the example data object X shown in FIG. 2, the client 104 may submit a query 108 to return a DP response 112 for generating a set of parameters θ for a general linear model that captures the correlation between the height of the patients (observable feature) and the age of the patients (label feature). As another example, the features may be categorical in nature, and the requested parameters θ may be for a general linear model that captures the correlation between the height, age, residence of the patients (observable features) and whether the patient will or has contracted a disease (label feature).

Examples of general linear models supported by the batch gradient engine 312 are, but not limited to, linear regression, logistic regression, and support vector machine (SVM) classifiers.

The optimal values for the set of parameters θ is found by training the general linear model on training data (Xtrain, ytrain) consisting of selected columns of data object X. Specifically, $X_{train}$ is a matrix database in which each column corresponds to a selected observable feature, and y is a column vector of the selected label feature values. Each entry in $X_{train}$ has a one-to-one correspondence with an entry in y. The optimal θ is generally found by minimizing a loss function on ($X_{train}$, $y_{train}$) over possible values of θ. Mathematically, the minimization is given by:

$$\theta = \underset{\theta}{\mathrm{argmin}}\, \ell\, (X_{train}, y_{train}; \theta).$$

The batch gradient engine 312 returns a DP response 112 $\theta_{DP}$ of a differentially private batch gradient query by perturbing the loss function to be minimized. Specifically, the perturbed minimization is given by:

$$\theta_{DP} = \underset{\theta}{\mathrm{argmin}}\, \ell\, (X_{train}, y_{train}; \theta) + \theta^T v \left( G\left( \frac{4 \cdot K^2 \cdot R_2^2 \cdot \left(\log\frac{1}{\delta} + \epsilon\right)}{\epsilon^2} \right) \right),$$

in which K is the Lipschitz constant for loss function $\ell\,(\bullet)$. v is a unit vector. If j is the index of the columns in $X_{train}$, $x_i^j$ denotes the value of entry i and column j in $X_{train}$, and it is publicly known that for each column j, $a^j \leq x_i^j \leq b^j$, $R_2$ may be given by:

$$R_2 = \max(\|u\|_2 a^j \leq u^j \leq b^j)$$

where u is a vector having elements $u^j$. The DP response 112 $\theta_{DP}$ may be provided for display on the user interface 150. $a^j$ and $b^j$ are the minimum and maximum values of column j, respectively. $R_2$ therefore is a radius value from a set of radius values representing a hypersphere that includes the values of the columns in the set of records. In an embodiment, $R_2$ is the minimum radius value of the set of radius values.

Stochastic Gradient Engine 314

Similarly to the batch gradient engine 312, the stochastic gradient engine 314 produces a DP response 112 responsive to the differentially private security system 102 receiving a valid query 108 for generating a set of parameters θ for a general linear model that captures the correlation between a series of observable features and a label feature, given privacy parameters (ε,δ). An example query command for accessing the stochastic gradient engine 314 is given in QC7 above.

Similar to the batch gradient engine 312, examples of general linear models supported by the stochastic gradient engine 314 are, but not limited to, linear regression, logistic regression, and support vector machine (SVM) classifiers.

The stochastic gradient engine 314 also minimizes a loss function on training data ($X_{train}$, $y_{train}$) over possible values of θ to find the optimal vales of parameter vector θ. However, the stochastic gradient engine 314 may minimize the loss function based on individual points or a subset of the training data, instead of the entire training data.

As discussed in reference to the batch gradient engine 312, a general minimization problem for finding the optimal values for θ over training data ($X_{train}$, $y_{train}$) is given by:

$$\theta = \underset{\theta}{\mathrm{argmin}}\, \ell\, (X_{train}, y_{train}; \theta)$$

where $\ell\,(\bullet)$ is a loss function. The minimization is solved by applying stochastic gradient descent on the loss function $\ell\,(\bullet)$ with respect to θ. This involves the steps of identifying an initial set of values for θ, calculating the gradient of the loss function with respect to θ, and updating θ based on the calculated gradient. The steps are repeated until the algorithm reaches convergence, and an optimal set of values for θ that minimize the loss function are identified.

Specifically, given the estimate for the parameter $\theta_t$ at time t, stochastic gradient descent generates a new estimate $\theta_{t+1}$ at the next time step t+1 by the following equation:

$$\theta_{t+1} = \theta_t - \eta_t \cdot n \cdot \nabla_{\theta_t}\, \ell\, (X_{train}, y_{train}; \theta),$$

in which $\nabla_{\theta_t}\, \ell\, (X_{train}, y_{train}; \theta)$ is the gradient of the loss function with respect to θ, and $\eta_t$ is the learning rate. The algorithm is repeated until the estimate for θ converges.

The stochastic gradient engine 314 returns a DP response 112 $\theta_{DP}$ of a differentially private stochastic gradient query by perturbing the update of θ at one or more time steps of the stochastic gradient descent algorithm. Specifically, a perturbed update at time t to t+1 is given by:

$$\theta_{t+1} = \theta_t - \eta_t \cdot n \cdot \nabla_{\theta_t}\, \ell\, (X_{train}, y_{train}; \theta) - \eta_t \cdot v \left( G\left( \frac{c_1^2 \cdot n^2 \cdot \left(\log\frac{n}{\delta} \cdot \log\frac{1}{\delta}\right)}{\epsilon^4} \right) \right),$$

where $\eta_t$ is the learning rate.

The stochastic gradient engine 314 may output the perturbed update at each time step as the DP response 112 for display on the user interface 150, or the converged parameter vector $\theta_{DP}$ as the DP response 112 for display on the user interface 150.

Random Forest Engine 316

The random forest engine 316 produces a DP response 112 responsive to the differentially private security system 102 receiving a valid query 108 for generating a trained random forest classifier that bins a series of feature values into one among multiple categories, given privacy parameters (ε,δ). The random forest classifier is trained on the selected columns of X. An example query command for accessing the random forest engine 316 is given in QC8 above. For the example data object X shown in FIG. 2, the client 104 may submit a query 108 to return a DP response 112 for generating a trained random forest classifier that receives values for the height and age of a patient and determines whether the patient has contracted the disease or not.

The random forest classifier, is trained on training data $(X_{train}, y_{train})$ to learn the correlation between the selected features of an entry and the category the entry belongs to. Specifically, $X_{train}$ is a matrix database in which each column corresponds to a selected feature of interest to the client 104, and y is a column vector of already known labels indicating the category of a corresponding entry. Each entry in $X_{train}$ has a one-to-one correspondence with a label entry in y. Upon being trained, the random forest classifier, or a classifier in general, receives a new data entry with selected feature values and generates an estimate of the category for the new entry.

The random forest classifier is an ensemble of individual binary decision tree classifiers, in which each binary decision tree generates an estimate for the category of an entry. Given a new data entry, the random forest classifier aggregates the category estimates from each binary decision tree and produces a final estimate for the category of the data entry.

Figure 5:
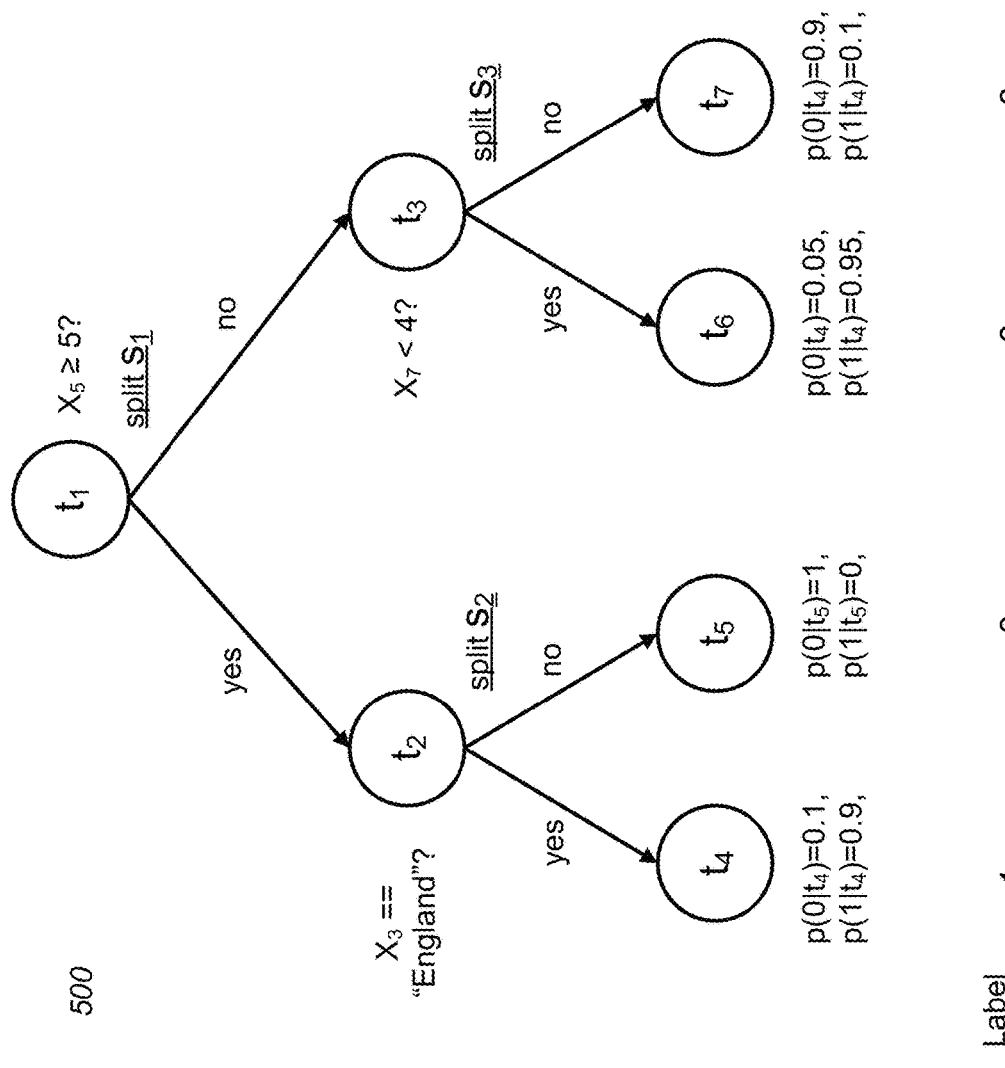
FIG. 5 illustrates an example binary decision tree for use in a differentially private random forest query, according to one embodiment.

FIG. 5 is an example diagram of a trained binary decision tree, according to one embodiment. Each decision tree includes a hierarchical structure with a plurality of T nodes $ti=1, 2, \ldots, T$ and a plurality of directed edges between a parent node and a child node. A parent node is a node that has outgoing edges to a child node, and a child node is a node that receives edges from a parent node. In the particular embodiment of a binary decision tree, each parent node has two child nodes. The nodes are one among a root node, in which the node has no incoming edges, an internal node, in which the node has one incoming edge with two outgoing edges, and a leaf node, in which the node has one incoming edge with no outgoing edges. For example, the example decision tree in FIG. 5 has seven nodes $t1, t2, \ldots, t7$ and six edges. t1 is the root node, t2 and t3 are internal nodes, and t4-t7 are leaf nodes.

For each trained binary decision tree, each node except the root node corresponds to a partition of training data entries formed by a split s at a parent node. The split s at the parent node is based on a test condition of a feature of the training data $(X_{train}, y_{train})$ that compares the feature value of an entry to a reference value, and verifies whether the feature value meets that condition or not. Returning to the example shown in FIG. 5, node $t_1$ creates a split $s_1$ into two child nodes $t_2$ and $t_3$ based on the test condition $x_5 \geq 5$, which checks if an entry contains a fifth feature value equal to or greater than 5. The training data $(X_{train}, y_{train})$ is thus split at $s_1$ into one partition that contains entries with $x_5 \geq 5$, and another partition that contains entries with $x_5 < 5$. The former partition is directed to child node $t_1$ and the latter partition is directed to child node $t_2$. The partitioning process is repeated until the leaf nodes of the binary decision tree are determined.

At the end of the training process, each leaf node is associated with a category that has a dominant proportion in the corresponding partition at the leaf node. In FIG. 5, leaf node t4 is assigned label "1," since the proportion of "1" labels in leaf node t4, denoted by p(1|t4), is greater than the proportion of "0" labels in leaf node t4, denoted by p(0|t4). Given a new data entry with an unknown category, the trained decision tree generates a label estimate by checking the appropriate feature values of the data entry at each node as it propagates through the tree to a destination leaf node. Upon arriving at the leaf node, the data entry is assigned the category label associated with the leaf node.

The random forest engine 316 returns a DP response 112 of a differentially private random forest query by perturbing the proportion of training data entries at leaf nodes of each trained binary decision tree. Specifically, the random forest engine 316 trains a random forest classifier T with an ensemble of $N_{trees}$ binary decision trees $B_{j=1, 2, \ldots, Ntrees}$ using training data $(X_{train}, y_{train})$ from the data object X. Assuming a binary classification problem with two labels "0" and "1," the random forest engine 316 perturbs the proportion of data entries associated with each category for each leaf node $t_L$. The perturbed proportion $p_{DP}(\bullet|t_L)$ is given by:

$$p_{DP}(0|t_L) \approx p(0|t_L) + L\left(\frac{\epsilon}{\log N_{trees}}\right),$$

$$p_{DP}(1|t_L) \approx p(1|t_L) + L\left(\frac{\epsilon}{\log N_{trees}}\right).$$

The random forest engine 316 returns the random forest classifier TDP containing an ensemble of perturbed binary decision trees $BDPj=1, 2, \ldots, Ntrees$ as the DP response 112. Moreover, the random forest engine 316 may display the perturbed proportion of data entries for leaf nodes of each binary decision tree $BDPj=1, 2, \ldots, Ntrees$ for display on the user interface 150.

Histogram Engine 318

The histogram engine 318 produces a DP response 112 responsive to the differentially private security system 102 receiving a query 108 for generating a histogram of a selected column in X, given privacy parameters $(\epsilon, \delta)$. The histogram engine 318 creates one or more bins corresponding to one or more disjoint ranges of the selected feature values, and indicates the number or proportion of entries that belong to each bin. An example query command for accessing the histogram engine 318 is given in QC9 above. For the example data object X shown in FIG. 2, the client 104 may submit a query 108 to return a DP response 112 for generating a histogram of the age of all patients for bins age 0-10, 11-20, 21-30, and so on.

The histogram engine 318 returns a DP response 112 of a differentially private histogram query by perturbing the counts for each bin.

Figure 6:
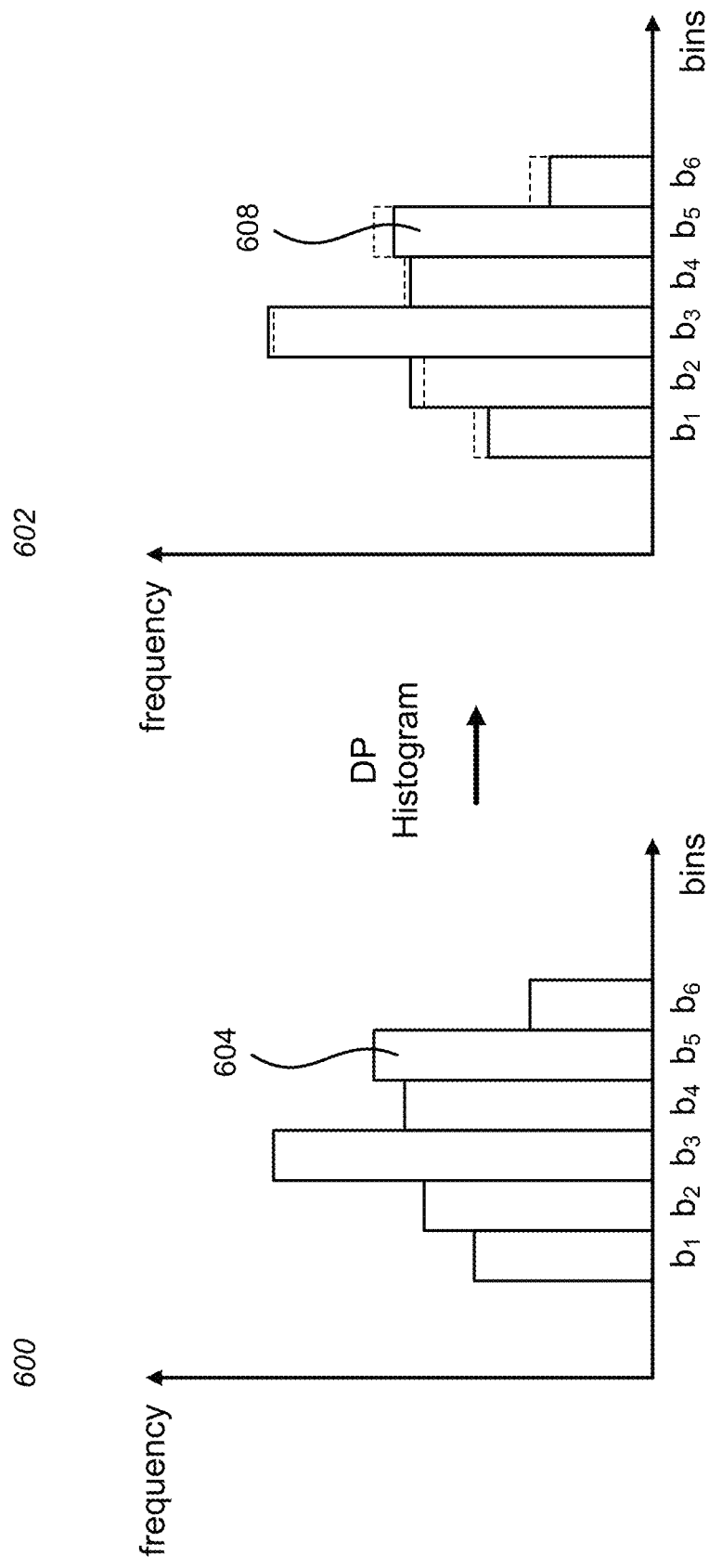
FIG. 6 illustrates perturbing the counts for a differentially private histogram query, according to one embodiment.

In one embodiment, the histogram engine 318 generates the requested histogram from the selected column of X, and perturbs the counts of each bin by submitting a request to the count engine 302. FIG. 6 illustrates perturbing the counts for a differentially private histogram query, according to one embodiment. As shown in FIG. 6, the histogram engine 318 generates histogram 600 by counting the number of entries corresponding to each bin $b_{i=1, 2, \ldots, B}$. The histogram engine 318 then requests the count engine 302 to perturb the counts qi for each bin to generate a perturbed histogram 602. As shown in FIG. 6, the count 608 for bin $b_5$ in the perturbed histogram 602 is a perturbed version of count 604 in the original histogram 600.

In another embodiment, the histogram engine 318 generates the requested histogram from the selected column of X, and perturbs the counts of each bin by decomposing the counts using a private wavelet decomposition algorithm. In such an embodiment, the histogram engine 318 aggregates the counts $q_{i=1, 2, \ldots, B}$ for each bin $b_{i=1, 2, \ldots, B}$ into a matrix (or vector) $Q$. The histogram engine 318 decomposes $Q$ into a tree structure that is representative of a wavelet decomposition. Each leaf node of the tree corresponds to a count $q_i$, and each parent node of the tree corresponds to one of multiple wavelet coefficients $c_{j=1, 2, \ldots, m}$. The value of a wavelet coefficient $c_j$ is calculated based on the counts $q_i$ incorporated in the leaf nodes of the tree. This allows a count $q_i$ to be reconstructed as a function $f_i$ of the wavelet coefficients $c_{j=1, 2, \ldots, m}$. That is, for each count $q_i$:

$$q_i = f_i(c_0, c_1, \ldots, c_m).$$

The histogram engine 318 generates a perturbed histogram by perturbing the wavelet coefficients, and reconstructing the counts using the perturbed wavelet coefficients. Specifically, the perturbed wavelet coefficients $c^{DP}_{i=1, 2, \ldots, m}$ are given by:

$$c_i^{DP} = c_i + L\left(\frac{2^{l+1}}{\epsilon \cdot m}\right).$$

The reconstructed counts from the perturbed wavelet coefficients is now given by:

$$q_i^{DP} = f_i(c_0^{DP}, c_1^{DP}, \ldots, c_m^{DP}).$$

The histogram engine 318 outputs the perturbed histogram as the DP response 112 for display on the user interface 150.

In one embodiment, the histogram engine 318 may also be used to generate a differentially private visualization of data entries as described above in reference to the count engine 302 and FIG. 4. For example, the histogram module 318 may construct a multi-dimensional histogram corresponding to counts of the requested data entries in each region, perturb the histogram using mechanisms described above (e.g., private wavelet decomposition algorithm), and display the differentially private plot of the requested data entries on the user interface 150.

Model Testing Engine 320

The model testing engine 320 produces a DP response 112 responsive to the differentially private security system 102 receiving a query 108 for testing the performance of a classification model, given privacy parameters (ε,δ). The classification model is trained and tested on selected columns of X. As such, the model testing engine 320 may be appended to any other module that trains a classifier on X, such as the batch gradient engine 312, the stochastic gradient engine 314, or the random forest engine 316. For the example data object X shown in FIG. 2, the client 104 may submit a query 108 to return a DP response 112 for generating a performance evaluation of a support vector machine classifier that was trained using the stochastic gradient engine 314.

As discussed in reference to the random forest engine 316, classification models in general is trained on training data ($X_{train}$, $y_{train}$) to learn the correlation between selected features of an entry and the category the entry belongs to. The training data ($X_{train}$, $y_{train}$) may be extracted from a subset of entries contained in the data object X. Upon being trained, the classifier is able to receive a new data entry containing values for the selected features and generate an estimate of the category for the new entry.

Often times, the estimate of the category for an entry is determined by applying a cutoff threshold to a numerical, not categorical, output of a classifier. For example, in the random forest classifier described in reference to the random forest engine 316, the category associated with a leaf node $t_L$ is determined by the proportion of training data entries associated with each category, which is a numerical value. The random forest engine 316 may determine that a leaf node is associated with category "0" if the proportion of entries associated with label "0" is above a cutoff threshold of 0.5, 0.6, or 0.7. As another example, logistic regression classifiers output a numerical value in the range of [0, 1] given an entry of feature values. The entry may be classified into category "0" if the associated output is below a cutoff threshold of 0.5, 0.4, or 0.3. Regardless of the example, the cutoff threshold for determining the boundary between each category is a critical parameter depending on the context the classifier is applied to.

The model testing engine 320 receives a trained classifier and tests the performance of the trained classifier a series of cutoff thresholds, and generates a confusion matrix for each threshold indicating the performance of the classifier. The model testing engine 320 may test the performance of the classifier on testing data ($X_{test}$, $y_{test}$). Similarly to training data, $X_{test}$ contains a set of entries with selected feature values, and $y_{test}$ contains a vector of already known labels for each corresponding entry in $X_{test}$. However, in contrast to training data, testing data ($X_{test}$, $y_{test}$) comprises entries that are not present in training data ($X_{train}$, $y_{train}$). That is, testing data comprises entries that the classifier has not "seen" yet.

Figure 7A:
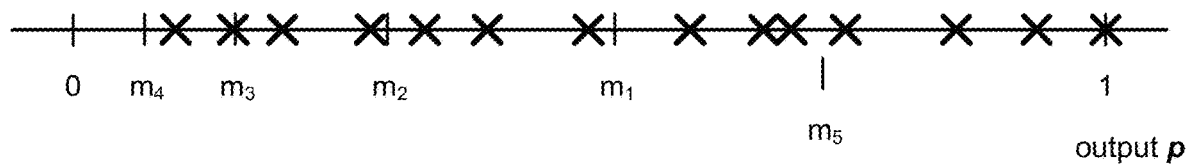
FIG. 7A illustrates a recursive process for identifying threshold points of the classification output vector for a differentially private model testing query, according to one embodiment.

The model testing engine 320 generates a series of cutoff thresholds based on the numerical values of p. FIG. 7A illustrates a recursive process for identifying threshold points of the classification output vector for the model testing engine 320, according to one embodiment. As shown in FIG. 7A, sample values of p are plotted on a range of 0 to 1. A series of k cutoff thresholds, or a series of intervals, are recursively identified by the median engine 304 such that the number of elements of p in each interval is approximately equal. Specifically, the median engine 304 recursively identifies the perturbed median for an interval and subsequently, its corresponding sub-intervals generated by dividing the interval by the identified perturbed median, until k thresholds are identified.

For example, as shown in FIG. 7, the median engine 304 identifies m1 as the perturbed median for the first interval [0, 1]. Subsequently, the median engine 304 identifies m2 as the perturbed median for the resulting sub-interval [0, m1], and m5 as the perturbed median for the sub-interval [m1, 1]. This process is repeated for sub-intervals [0, m2], [m2, m1], [m1, m5], [m5, 1] and for its sub-intervals until k thresholds, mi=1, 2, . . . , k are identified.

For each threshold $m_i$, the model testing engine 320 generates corresponding category label estimates from p, and compares the estimates to the vector of known labels $y_{test}$. Given the comparisons, the model testing engine 320 constructs a confusion matrix that evaluates the performance of the classifier.

Figure 7B:
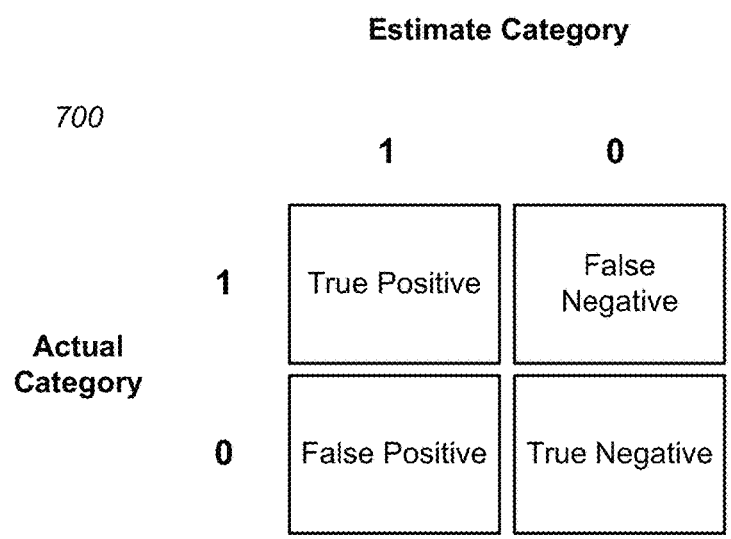
FIG. 7B illustrates an example confusion matrix generated during a differentially private model testing query.

FIG. 7B illustrates an example confusion matrix 700 generated by the model testing engine 320, according to one embodiment. As shown in FIG. 7B, the confusion matrix 700 contains the number of testing data entries for 4 categories: i) entries that have an actual category of "1" and an estimate category of "1" ("True Positive" entries), ii) entries that have an actual category of "0" and an estimate category of "0" ("True Negative" entries), iii) entries that have an actual category of "0" and an estimate category of "1" ("False Positive" entries), and iv) entries that have an actual category of "1" and an estimate category of "0" ("False Negative" entries). For a given threshold, a data entry only contributes to one among the 4 categories.

For each threshold $m_i$, the model testing engine 320 generates a perturbed confusion matrix by using the histogram engine 318. This is because each entry contributes to only one among the 4 disjoint categories, and thus, the entries in the confusion matrix 700 can be viewed as a histogram. The model testing engine 320 outputs each threshold $m_i$, and the corresponding perturbed confusion matrix as the DP response 112 for display on the user interface 150.

Synthetic Database Engine 322

The synthetic database engine 322 produces a DP response 112 responsive to the differentially private security system 102 receiving a query 108 for transforming X into a synthetic database S, given privacy parameters $(\varepsilon,\delta)$. The resulting synthetic database S has a number of entries corresponding to that in X, but a fewer number of columns or features than X. Moreover, the spatial relationship between a pair of entries in X is retained in S. The transformation of X to S is $(\varepsilon,\delta)$-differentially private with respect to a neighboring data object X' with a 1-element difference from X.

The synthetic database engine 322 produces a DP response 112 of a differentially private synthetic database query by projecting the elements of X to S using a projection matrix. Assuming that data object X is a n×p matrix having n rows and p columns, the transformation by the synthetic database engine 322 is given by:

$$S = X * J\left(G\left(\frac{4 \cdot \log\delta}{n^2 \cdot \varepsilon^2}\right)\right)$$

where J is a p×k projection matrix, with k<p. The resulting synthetic database matrix S is a n×k matrix containing equal number of entries or rows as data object matrix X, but containing a smaller number of features or columns than the original data object X.

As discussed above, the transformation using projection matrix J is $(\varepsilon,\delta)$-differentially private. Moreover, the spatial relationship between a pair of entries in X is retained in S. That is, the distance between a pair of entries (xi,xj) in the p-dimensional feature space of X is approximately equal to the distance between a pair of entries (si,sj) in the k-dimensional feature space of S. The synthetic database engine 322 outputs S as the DP response 112 for display on the user interface 150.

Figure 8:
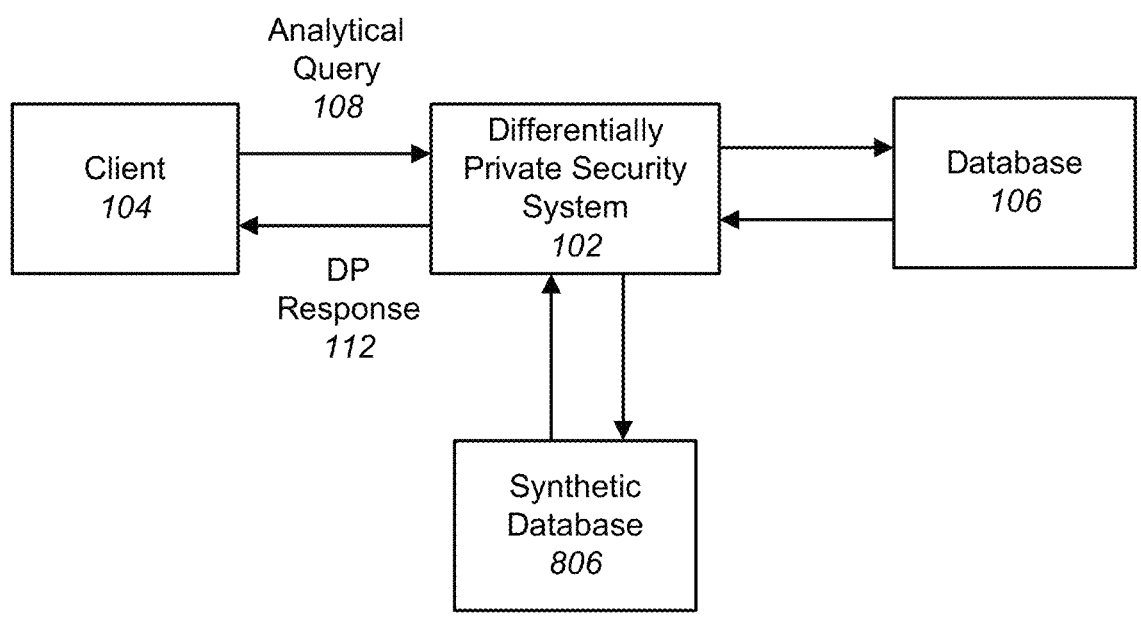
FIG. 8 illustrates a system-level modification to the system of FIG. 1 that allows the client to access to a differentially private synthetic database, according to one embodiment.

FIG. 8 is a modification 800 of the system 100 in FIG. 1 that allows the client 104 access to synthetic database 806 generated by the synthetic database engine 322, according to one embodiment. As shown in FIG. 8, the modified system 800 may allow the client 104 to access the synthetic database 806 generated by the synthetic database engine 322 through the differentially private security system 102. Since the transformation from X to S is $(\varepsilon,\delta)$-differentially private, the privacy of X is retained.

Figure 9:
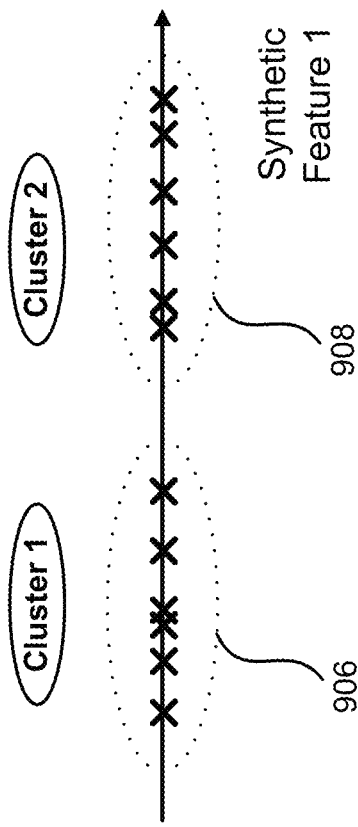
FIG. 9 illustrates the application of a clustering query to entries of a differentially private synthetic database, according to one embodiment.
Figure 9:
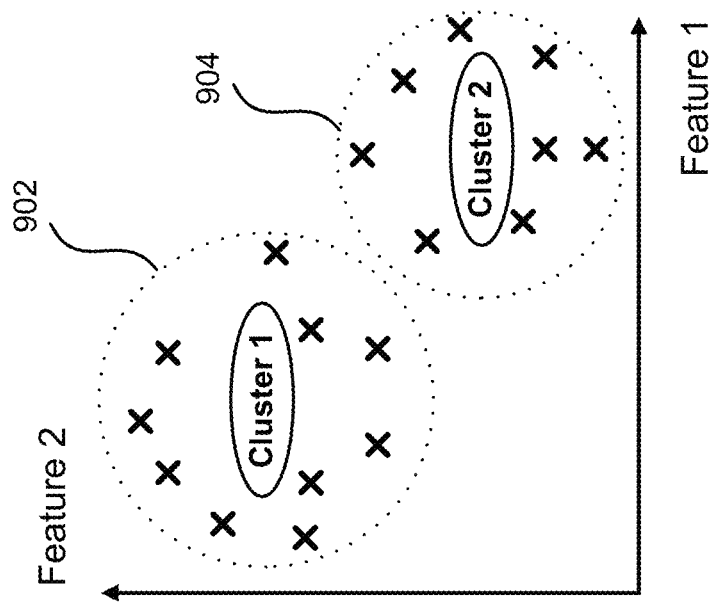

FIG. 9 illustrates applying a clustering query to entries of the synthetic database, according to one embodiment. The various modules of the privacy system 160 and other analytical modules may be applied to the synthetic database 806 instead of the data object X to extract patterns or trends related to the information in X. The results of the analysis on the synthetic database 806 may also be provided for display on the user interface 150. For example, the client 104 may submit a clustering query on the entries of the synthetic database 806 using the batch gradient engine 312 or the stochastic gradient engine 314.

In the example of FIG. 9, clusters 902 and 904 are results of a non-differentially private clustering query on a data object X having two columns or features. Each cluster 902 and 904 are associated with a group of entries. Since the clustering query is not differentially private on X, the results of the query are not shown to the client 104. Clusters 906 and 908 are results of a non-differentially private clustering query on the synthetic database S having one column or feature due to the transformation by the synthetic database engine 322. Since the transformation preserves the spatial relationship between a pair of entries, cluster 906 is largely associated with the same entries in cluster 902, and cluster 908 is largely associated with the same entries in cluster 904. Since the synthetic database S is $(\varepsilon,\delta)$-differentially private, the results of the clustering query may be displayed to the client 104 using the user interface 150.

Validation Engine 324

The validation engine 324 produces a DP response 112 responsive to the differentially private security system 102 receiving a request for whether a query 108 satisfies the definition of $(\varepsilon,\delta)$-differential privacy for privacy parameters $(\varepsilon,\delta)$. In one embodiment, the validation engine 324 may receive a function call from the client 104 that points to the query 108. The query 108 may be, for example, an analytical model or an algorithm that can be applied to a data object X.

The validation engine 324 certifies whether the received query 108 satisfies the definition of $(\varepsilon,\delta)$-differential privacy by applying the query 108 to example pairs of neighboring data objects (Z, Z'). Specifically, the validation engine 324 generates pairs of neighboring data objects (Z, Z'), having at most 1 entry different from each other. The validation engine 324 applies the received query 108 to each example pair of neighboring data objects (Z, Z') and determines whether an estimate of the quantity $\Pr[M(X)\in S]/\Pr[M(X')\in S]$ satisfies the definition of $(\varepsilon,\delta)$-differential privacy a sampling of outputs from S of the query M and over the randomness of the query M.

In one embodiment, the validation engine 324 may output a binary value to the client 104 as the DP response 112 for display on the user interface 150 that indicates whether or not the query 108 is $(\varepsilon,\delta)$-differentially private. In some embodiments, the validation engine 324, in response to a determination that the query 108 is not $(\varepsilon,\delta)$-differentially private, can reject or deny the query.

Figure 10:
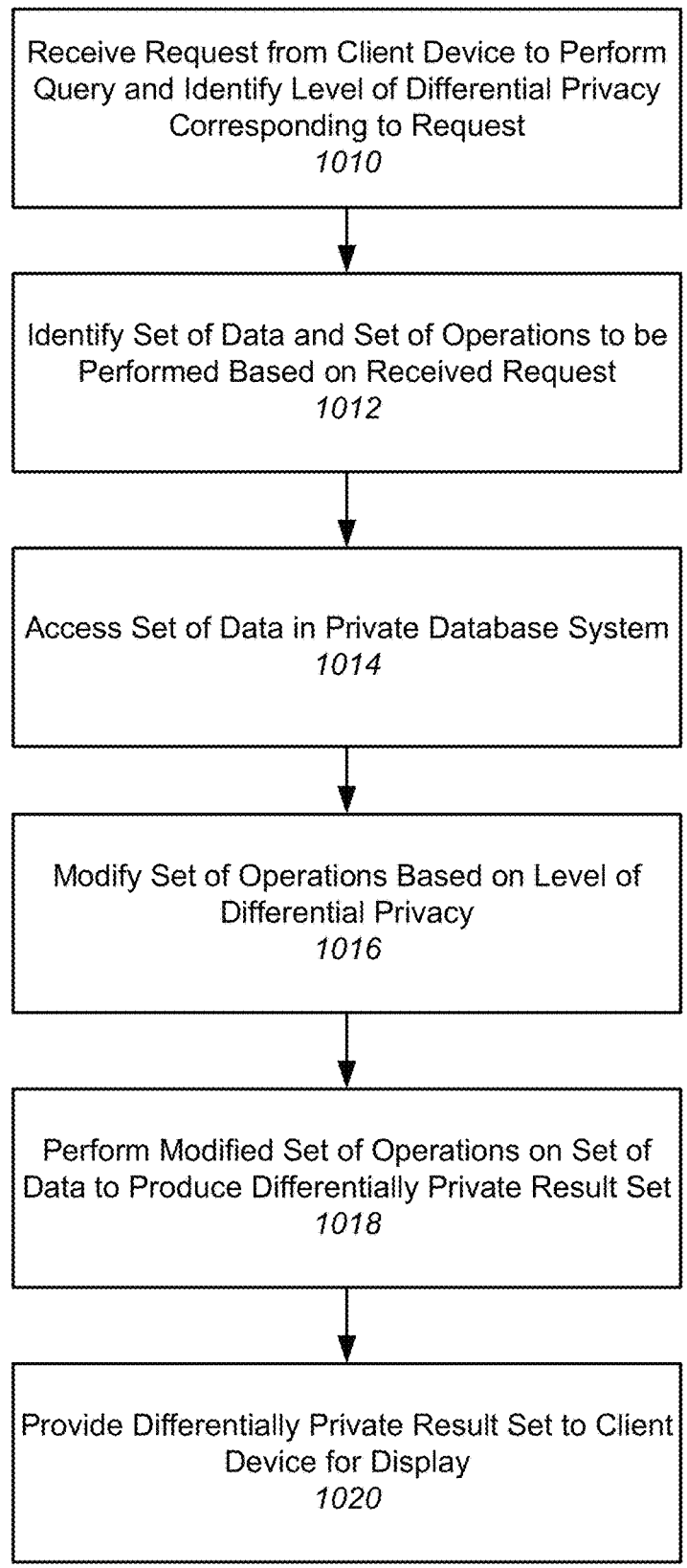
FIG. 10 illustrates a process for responding to a database query by executing a differentially private version of the query on the database, according to one embodiment.

FIG. 10 illustrates a process for responding to a database query by executing a differentially private version of the query on the database, according to one embodiment.

A request from a client device to perform a query is received 1010 and a level of differential privacy corresponding to the request is identified. A set of data in the private database system and a set of operations to be performed based on the received request is identified 1012. The set of identified data in the private database system is accessed 1014. The set of operations is modified 1016 based on the received level of differential privacy. The set of modified operations is performed 1018 on the set of data to produce a differentially private result set. The differentially private result set is provided 1020 to the client device for display on the client device.

Figure 11:
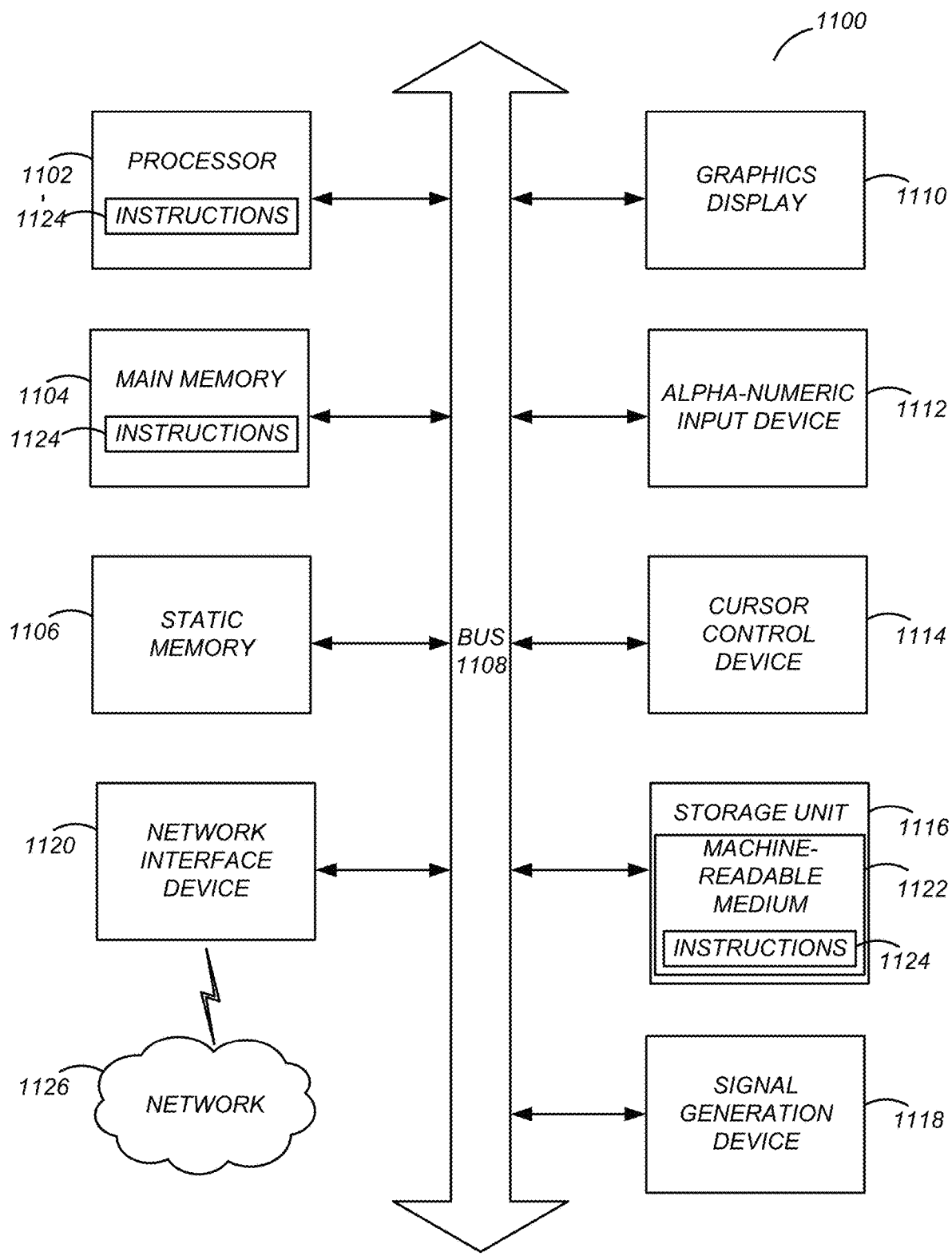
FIG. 11 is a block diagram illustrating components of an example machine able to read instructions from a machine-readable medium and execute them in a processor (or controller).

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104 and the storage unit 1116 communicate via a bus 1108.

In addition, the computer system 1106 can include a static memory 1106, a display driver 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but not be limited to, data repositories in the form of solid-state memories, optical media, and magnetic media.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for receiving a query for a private database, and responding to the query by executing a differentially private version of the query on the private database. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method for returning differentially private results in response to a query to a database storing restricted data as records comprising rows and columns, the method comprising:

receiving a database query from a client device, the database query requesting a linear model describing correlations among values of columns in a set of records in the database, the database query identifying a level of differential privacy corresponding to the request, the identified level of differential privacy comprising privacy parameters ε and δ, wherein ε describes a degree of information released about the restricted data stored in the database due to the query, and δ describes an improbability of the query satisfying (ε)-differential privacy;

performing the database query on the set of records in the database to produce a differentially private version of the linear model that maintains the identified level of differential privacy for the restricted data, performing the query comprising:

modeling the values of the columns in the set of records in the database to produce a linear model comprising a set of parameters θ that describe correlations among the values;

minimizing a loss function on the linear model over possible values of the set of parameters θ to produce an optimal set of parameters θ; and perturbing the optimal set of parameters θ to produce the differentially private version of the linear model, the set of parameters θ produced by optimizing a loss function perturbed by an additive term defined by:

$$\theta^T v \left( G\left( \frac{4 \cdot K^2 \cdot R_2^2 \cdot \left(\log\frac{1}{\delta} + \epsilon\right)}{\epsilon^2} \right) \right)$$

where K is a constant, $R_2$ is a value based on the columns in the set of records, G( ) denotes a Gaussian random variable, and v denotes a unit vector; and returning the differentially private version of the linear model to the client device in response to the query.

2. The method of claim 1, wherein the client device is used by a user and further comprising:

identifying a privacy budget associated with the user, the privacy budget representing remaining queries available to the user in terms of the privacy parameters ε and δ;

decrementing the privacy budget associated with the user responsive to performing the database query and based on the privacy parameters corresponding to the request to produce a decremented privacy budget.

3. The method of claim 2, further comprising:

receiving a subsequent query of the database from the user, the subsequent query identifying a corresponding level of differential privacy;

checking whether the corresponding level of differential privacy can be accommodated by the decremented privacy budget; and denying the subsequent query responsive to the check indicating that the corresponding level of differential privacy cannot be accommodated by the decremented privacy budget.

4. The method of claim 1, wherein the linear model is at least one of a linear regression classifier, a logistic regression classifier, and a support vector machine classifier.

5. The method of claim 1, wherein K is the Lipschitz constant and wherein $R_2$ is a radius value representing a radius of a hypersphere that includes values of the columns in the set of records.

6. The method of claim 1, wherein minimizing the loss function on the linear model over possible values of the set of parameters θ to produce an optimal set of parameters θ comprises:

$$\text{minimizing according to } \theta = \underset{\theta}{\mathrm{argmin}}\, \ell\, (X_{train}, y_{train}; \theta).$$

where $X_{train}$ and $Y_{train}$ are training data comprising columns in the set of records and $\ell$( ) is the loss function.

7. The method of claim 1, wherein each column in the set of records represents one of a label feature and an observable feature describing the restricted data.

8. A non-transitory computer-readable storage medium storing computer program instructions executable by a processor to perform operations for returning differentially private results in response to a query to a database storing restricted data as records comprising rows and columns, the operations comprising:

receiving a database query from a client device, the database query requesting a linear model describing correlations among values of columns in a set of records in the database, the database query identifying a level of differential privacy corresponding to the request, the identified level of differential privacy comprising privacy parameters ε and δ, wherein ε describes a degree of information released about the restricted data stored in the database due to the query, and δ describes an improbability of the query satisfying (ε)-differential privacy;

performing the database query on the set of records in the database to produce a differentially private version of the linear model that maintains the identified level of differential privacy for the restricted data, performing the query comprising:

modeling the values of the columns in the set of records in the database to produce a linear model comprising a set of parameters θ that describe correlations among the values;

minimizing a loss function on the linear model over possible values of the set of parameters θ to produce an optimal set of parameters θ; and perturbing the optimal set of parameters θ to produce the differentially private version of the linear model, the set of parameters θ produced by optimizing a loss function perturbed by an additive term defined by:

$$\theta^T v \left( G\left( \frac{4 \cdot K^2 \cdot R_2^2 \cdot \left(\log\frac{1}{\delta} + \epsilon\right)}{\epsilon^2} \right) \right)$$

where K is a constant, $R_2$ is a value based on the columns in the set of records, G( ) denotes a Gaussian random variable, and v denotes a unit vector; and returning the differentially private version of the linear model to the client device in response to the query.

9. The non-transitory computer-readable storage medium of claim 8, wherein the client device is used by a user, the operations further comprising:

identifying a privacy budget associated with the user, the privacy budget representing remaining queries available to the user in terms of the privacy parameters ε and δ;

decrementing the privacy budget associated with the user responsive to performing the database query and based on the privacy parameters corresponding to the request to produce a decremented privacy budget.

10. The non-transitory computer-readable storage medium of claim 9, further comprising:
receiving a subsequent query of the database from the user, the subsequent query identifying a corresponding level of differential privacy;
checking whether the corresponding level of differential privacy can be accommodated by the decremented privacy budget; and
denying the subsequent query responsive to the check indicating that the corresponding level of differential privacy cannot be accommodated by the decremented privacy budget.

11. The non-transitory computer-readable storage medium of claim 8, wherein the linear model is at least one of a linear regression classifier, a logistic regression classifier, and a support vector machine classifier.

12. The non-transitory computer-readable storage medium of claim 8, wherein K is the Lipschitz constant and wherein $R_2$ is a radius value representing a radius of a hypersphere that includes values of the columns in the set of records.

13. The non-transitory computer-readable storage medium of claim 8, wherein minimizing the loss function on the linear model over possible values of the set of parameters θ to produce an optimal set of parameters θ comprises:

$$\text{minimizing according to } \theta = \underset{\theta}{\mathrm{argmin}}\, \ell\, (X_{train}, y_{train}; \theta).$$

where $X_{train}$ and $Y_{train}$ are training data comprising columns in the set of records and $\ell()$ is the loss function.

14. The non-transitory computer-readable storage medium of claim 8, wherein each column in the set of records represents one of a label feature and an observable feature describing the restricted data.

15. A system comprising:
a processor for executing computer program instructions; and
a non-transitory computer-readable storage medium storing computer program instructions executable by the processor to perform operations for returning differentially private results in response to a query to a database storing restricted data as records comprising rows and columns, the operations comprising:
receiving a database query from a client device, the database query requesting a linear model describing correlations among values of columns in a set of records in the database, the database query identifying a level of differential privacy corresponding to the request, the identified level of differential privacy comprising privacy parameters ε and δ, wherein ε describes a degree of information released about the restricted data stored in the database due to the query, and δ describes an improbability of the query satisfying (δ)-differential privacy;
performing the database query on the set of records in the database to produce a differentially private version of the linear model that maintains the identified level of differential privacy for the restricted data, performing the query comprising:
modeling the values of the columns in the set of records in the database to produce a linear model comprising a set of parameters θ that describe correlations among the values;
minimizing a loss function on the linear model over possible values of the set of parameters θ to produce an optimal set of parameters θ; and
perturbing the optimal set of parameters θ to produce the differentially private version of the linear model, the set of parameters θ produced by optimizing a loss function perturbed by an additive term defined by:

$$\theta^T v\left( G\left( \frac{4 \cdot K^2 \cdot R_2^2 \cdot \left(\log\frac{1}{\delta} + \epsilon\right)}{\epsilon^2} \right) \right)$$

where K is a constant, $R_2$ is a value based on the columns in the set of records, G( ) denotes a Gaussian random variable, and v denotes a unit vector; and
returning the differentially private version of the linear model to the client device in response to the query.

16. The system of claim 15, wherein the client device is used by a user, the operations further comprising:
identifying a privacy budget associated with the user, the privacy budget representing remaining queries available to the user in terms of the privacy parameters ε and δ;
decrementing the privacy budget associated with the user responsive to performing the database query and based on the privacy parameters corresponding to the request to produce a decremented privacy budget.

17. The system of claim 16, the operations further comprising:
receiving a subsequent query of the database from the user, the subsequent query identifying a corresponding level of differential privacy;
checking whether the corresponding level of differential privacy can be accommodated by the decremented privacy budget; and
denying the subsequent query responsive to the check indicating that the corresponding level of differential privacy cannot be accommodated by the decremented privacy budget.

18. The system of claim 15, wherein the linear model is at least one of a linear regression classifier, a logistic regression classifier, and a support vector machine classifier.

19. The system of claim 15, wherein K is the Lipschitz constant and $R_2$ is a radius value representing a radius of a hypersphere that includes values of the columns in the set of records.

20. The system of claim 15, wherein minimizing the loss function on the linear model over possible values of the set of parameters θ to produce an optimal set of parameters θ comprises:

$$\text{minimizing according to } \theta = \underset{\theta}{\mathrm{argmin}}\, \ell\, (X_{train}, y_{train}; \theta).$$

where $X_{train}$ and $Y_{train}$ are training data comprising columns in the set of records and $\ell()$ is the loss function.

* * * * *